United States Patent

McIntosh

[15] 3,644,833

[45] Feb. 22, 1972

[54] EAR-SUPPORTED RADIO RECEIVER

[72] Inventor: Frank H. McIntosh, Chevy Chase, Md.

[73] Assignee: Lectour Communications Corporation, New York, N.Y.

[22] Filed: July 12, 1966

[21] Appl. No.: 564,666

[52] U.S. Cl. ..............................325/361, 325/318, 325/352, 343/200

[51] Int. Cl. ..............................H04b 1/08

[58] Field of Search ..............................179/107 PC, 182, 107, 107 S, 179/156; 325/361, 318, 319, 352, 392; 320/2

[56] References Cited

UNITED STATES PATENTS

| | | | |
|---|---|---|---|
| 2,802,938 | 8/1957 | Herzog | 325/318 X |
| 2,820,890 | 1/1958 | Koch | 325/352 |
| 2,802,214 | 8/1957 | Hanks | 179/182 |
| 3,078,348 | 2/1963 | McIntosh | 343/200 |
| 3,345,568 | 10/1967 | Errichiello | 325/361 |
| 3,354,271 | 11/1967 | McDermaid | 179/107 |
| 2,899,499 | 8/1959 | Eichwald | 179/156 |
| 2,975,244 | 3/1961 | Lehr | 179/156 |

FOREIGN PATENTS OR APPLICATIONS

| | | | |
|---|---|---|---|
| 1,093,839 | 12/1960 | Germany | 320/2 |

OTHER PUBLICATIONS

Popular Mechanics, Page 114, Feb. 1960.

*Primary Examiner*—Benedict V. Safourek
*Attorney*—Hurvitz and Rose

[57] ABSTRACT

A radio receiver including a printed circuit board having an oval cutout which fits over the human ear and is supported by the ear in listening position.

1 Claims, 6 Drawing Figures

INVENTOR
FRANK H. McINTOSH

BY Hurvitz & Rose

ATTORNEYS

INVENTOR
FRANK H. McINTOSH

BY Hurvitz & Rose
ATTORNEYS

EAR-SUPPORTED RADIO RECEIVER

The present invention relates to a system of broadcast transmitters and receivers wherein transmitters broadcast plural programs to a restricted area, such as a room of a building, and its receivers which are self-contained and mountable on the ears of persons who are free to move about the area and are enabled to receive the programs selectively.

Museums, art galleries, industrial exhibits and other exhibitions having a plurality of exhibits need a system for repeatedly and automatically delivering a lecture, or plural lectures simultaneously, receivable within the area adjacent an exhibit of interest but not within the areas adjacent surrounding exhibits. Persons viewing the exhibits require that the receivers carried for reception of various broadcast programs be of light weight and unobtrusive, require no manipulation, i.e., adjustment of tuning an volume, and which leave the hands free.

It is, accordingly, a broad object of the invention to provide a system of short range broadcasting of multiple programs without mutual interference.

It is another object of the invention to provide a very light weight ear carried broadcast receiver that does not impede normal personal activity nor require manipulation to accomplish optimum reception, and which is nondirectional.

Briefly describing the invention, a plurality of tape heads is employed to provide multiple programs, wherein each of the heads provides a different program. Each reproducer is coupled to a separate transmitter. The transmitters may each feed a different carrier frequency to a single antenna, but the system may employ one or more transmitters driving separate sufficiently spaced apart antennas at the same carrier frequency. In one preferred mode of operating the invention, it is desired to broadcast programs into separate rooms of the same building. In such case the antennae employed may be constituted of loops extending about the boundaries of the room at floor level. Signals may then be received anywhere within each room, at a relatively high level, but the level of signal in an adjacent room is quite low, and does not present an insoluble interference program. Where desired, a plurality of programs modulating carriers of different frequencies may be applied to a single antenna, enabling a plurality of programs to be received in a single room, but the observer or an attendant must then tune the receiver to select the carriers.

Of particular importance in the present invention is the structure of the receiver housing. The components of the receiver are mounted on one side of printed circuit board having a somewhat oblong outer dimension and an oblong opening in its central region which may be hung over the external human ear, with the ear extending through the hole. The ear side of the printed circuit board is covered by a spongy material, to present a soft surface to the ear and head and the central hole in the board is covered on the ear side of the board by a plastic cup meant to cover the ear as it extends through the central hole in the printed circuit board, and to conserve internal sound and exclude external sounds. The circuit side of the printed circuit board along with the plastic cup for covering the ear is enclosed in an ornamental plastic shell, which is alone observed when the receiver is in operation. The receiver is intended to be supported by the external ear via the oblong opening.

The receivers of the system are arranged to be powered by means of rechargeable nickel-cadmium batteries. Normally the receivers will be in the possession of exhibit viewers or in the possession of those responsible for receiver renter or assignment. While the receivers are in the possession of exhibit viewers the receivers will be operating. While the receivers are in the possession of those responsible for receiver rental or assignment the battery can be recharged. Because of the use to be made of the receivers, they are designed to be turned ON by the removal of a recharge plug from a receiver carried jack and turned OFF by insertion of the recharge plug in the receiver carried jack.

Still another object of the invention is to provide a receiver mounted on a printed circuit board which may be supported on the external portions of the human ear during use.

Yet another object of the invention is to provide a radio receiver which is very light and which may be economically constructed.

The fact that two programs are to be transmitted via a single loop antenna leads to problems of loop tuning, and to problems of crosstalk. In accordance with a feature of the invention, the loop antenna is tunable. The tuning means plus antenna has a sufficiently low Q, that two transmissions, or more by expansion of the system, can be efficiently conducted simultaneously. In a system employing two transmitters carrier frequencies of 100kc. and 179.5 kc., are employed. No reasonably low harmonic of either carrier frequency coincides with a reasonably low harmonic of the other, so that harmonics of the carrier cannot provide crosstalk. Wide selections of carrier frequencies for this purpose are available to the skilled designer, but these cannot be unduly far apart if tuning problems are to be met. Tuning control is also used to control relative amplitudes of radiated outputs of the two transmitters, since if the tuning loop is resonated to a frequency midway of its radiated frequencies, each transmitter will be working into a load corresponding with a point on the slope of a resonance curve, but on opposite slopes.

As to the receiver, it utilizes a ferrite rod as an antenna, contains two stages of RF amplification, a transformer coupled solid-state diode detector and an audio amplifier, and is completely transistorized. Provision is made for selectively tuning to the two frequencies available, in response to single pushbutton control. An important feature of the receiver is its use of AGC to assure level response over a wide range of signal input levels of a single biased solid state diode rectifier circuit to provide RF AGC voltage and audio signal, this same circuit also providing bias control.

The above and still further objects, features and advantages of the present invention will become apparent upon consideration of the following detailed description of one specific embodiment thereof, especially when taken in conjunction with the accompanying drawings, wherein.

Figures 1, 2:
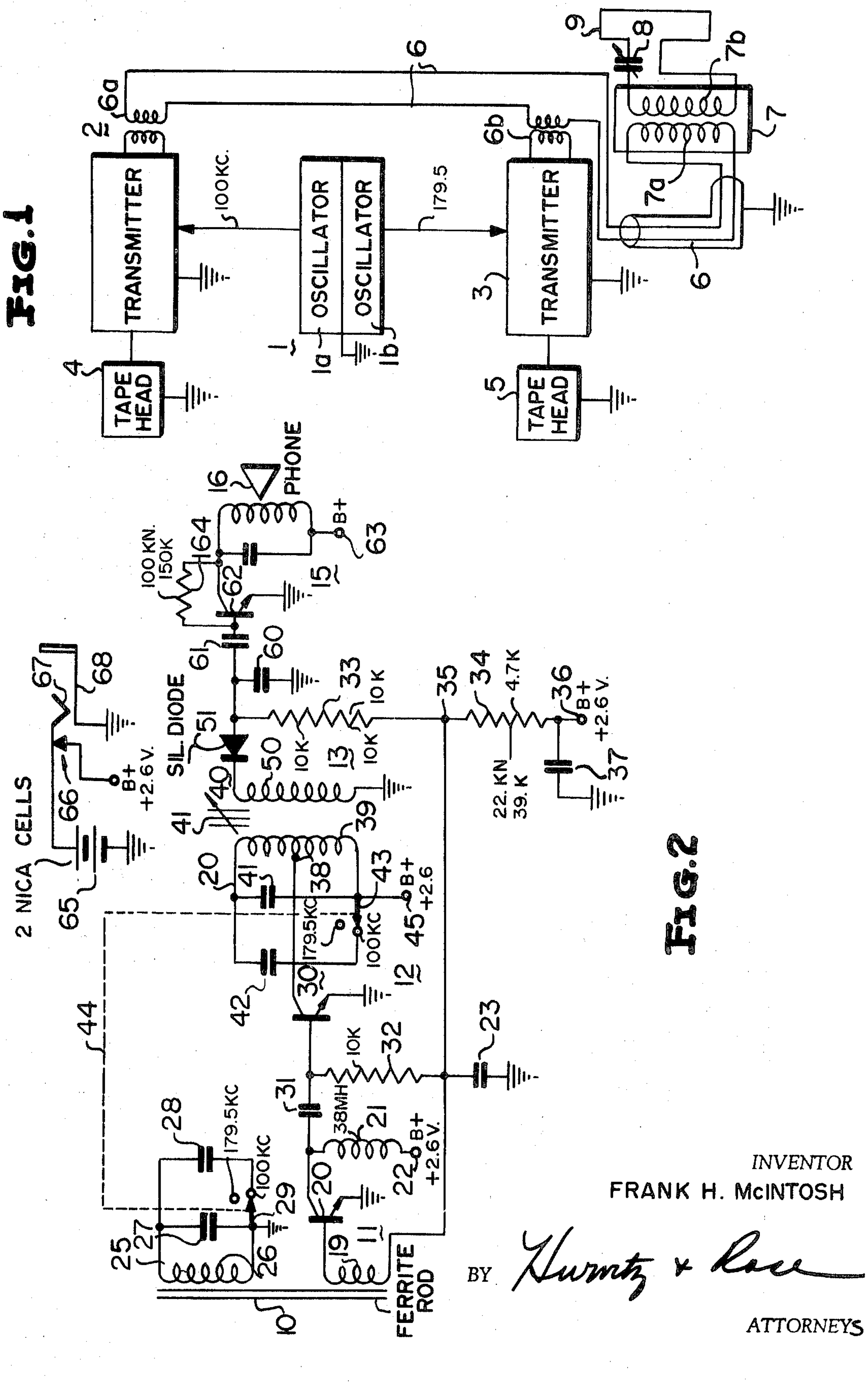
FIG. 1 is a block diagram of a transmitter system according to the present invention.
FIG. 2 is a schematic circuit diagram of a receiver according to the present invention.
Figure 3:
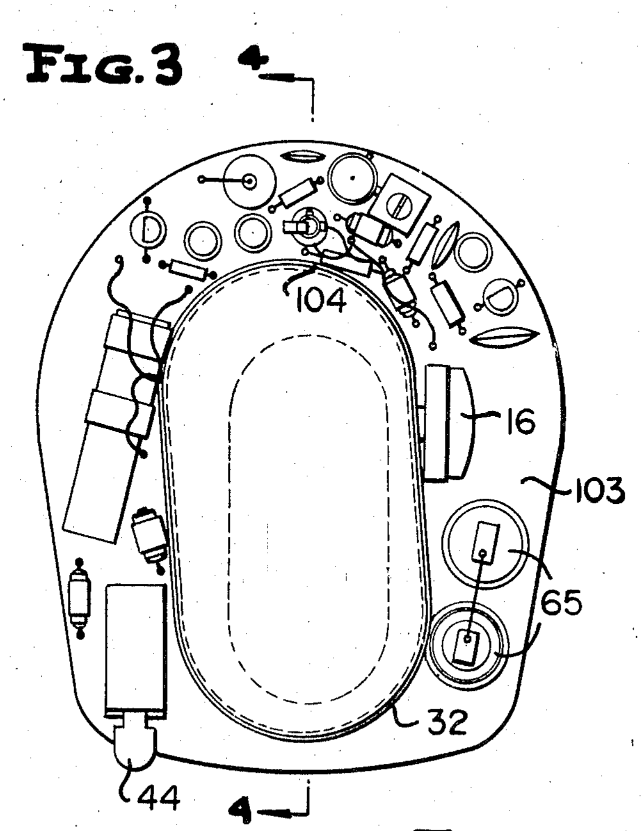
FIG. 3 is a view in plan of the electronic side of the receiver of FIG. 2.
Figure 4:
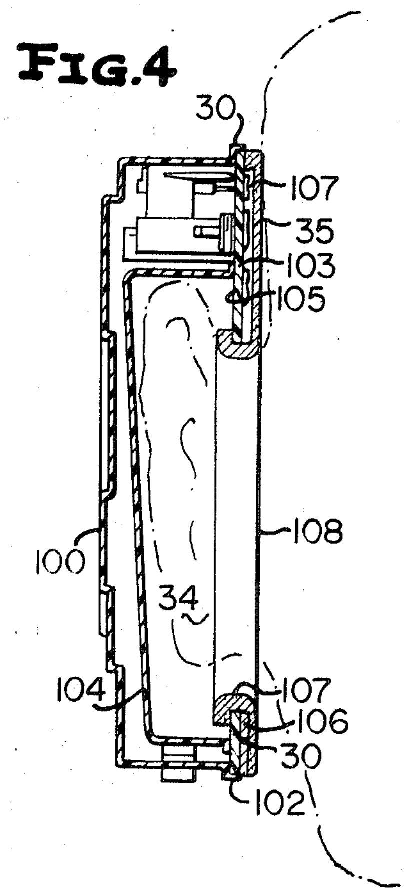
FIG. 4 is a transverse cross section of the receiver of FIG. 3.

The oscillation source of the transmitter system is composed of two distinct oscillators 1*a* and 1*b*, which generate distinct frequencies of relatively low value, for example, 100 kc. and 179.5 kc., respectively. The oscillator 1*a* supplies RF drive current to a transmitter 2 while the oscillator 1*b* supplies RF drive current to a transmitter 3. Means are included in transmitter 2 for modulating the 100 kc., signal supplied by oscillator 1*a* with the audio output of a first tape head 4. Means are also provided for modulating the carrier at frequency 179.5 kc., with the output of a second tape head 5. In general the tape heads 4 and 5 will be included in the single reproducer machine that will read two tracks of a single magnetic tape. The transmitter 2 supplies this output to a transmission line 6 via a coupling transformer 6*a* and the transmitter 3 likewise couples its output to the same transmission line 6 via a coupling transformer 6*b*. The two transformer secondaries are in series with the transmission line to a two wire line, and the line 6 leads to the primary 7*a* of a transformer 7. Accordingly, the primary 7*a* of the transformer 7, the secondaries of the transformers 6*a* and 6*b* and the leads of the transmission line 6 form a closed loop within which modulated carrier flows, supplied at different points along the loop in a series feed circuit. The secondary 7*b* of the transformer 7 is connected to a loop antenna 9, in series with a tuning capacitor 8. The tuning capacitor 8, in the event both transmitters 2 and 3 are operating at the same time, may be tuned about midway between the frequencies of these transmitters and the Q of the loop, including its associated coupled circuits, is sufficiently low that both transmitters can drive relatively high signal level into the loop. On the other hand, one of the transmitters 2, 3 may be operated to the exclusion to the other, for some particular service, and in such case the capacitor 8 may be adjusted to provide maximum response for the one frequency involved. The timing capacitor 8 provides, thus, a device for adjusting relative amplitudes of signals of the two carriers.

Loop 9 is normally or conveniently located about the circumference of a room, at the junctions of the walls and floors. It is arranged to couple energy to a small vertical ferrite rod antenna, which may be located anywhere in the room and which may be carried by a listener. Since both transmitters 2 and 3 may be supplying RF energy simultaneously to the loop 9 and may carry different programs, it is essential that cross-talk between the two transmitter outputs be avoided. To this end the carriers selected for the two transmitters are widely separated so that no problems of critical tuning of receiver circuitry are involved. The loop 9 itself is of sufficiently low Q that it may be tuned to either of the frequencies 100 kc., or 179.5 kc., or by being tuned about midway between the two, may radiate both frequencies at sufficient amplitudes for its purposes. At the same time the two frequencies utilized are not harmonically related, but are so selected that no reasonably low harmonic of either frequency might be expected to provide cross talk with a harmonic of the other. The receivers involved may then be relatively low Q receivers, so that tuning is not critical. By employing a loop 9 which surrounds the area within which a listener may be located, maximum transfer efficiency from the loop to the listener's antenna is achieved, and at the same time virtual isolation of adjacent rooms, the latter may be provided with their own loops and their own diverse programs.

The receiver of the present system, a schematic circuit diagram of which is provided in FIG. 2 of the drawings, includes a ferrite rod antenna 10. The rod 10 is coupled to an input winding of an RF amplifier 11, located in the input circuit of that amplifier. The amplifier 11 couples to a second stage RF amplifier 12, which has a tuned output circuit. The second stage amplifier 12 is coupled to a solid state diode detector 13 and the latter is in turn coupled to an audio amplifier 15, which drives a loudspeaker 16.

The amplifier 11 utilizes a PNP transistor having its emitter grounded and its collector coupled through a load inductance 21 to a B+ terminal 22. One terminal of the coil 19 is connected directly to the base of the transistor 20, while the other end of the coil 19 is connected to one terminal of a capacitor 23, having its other terminal grounded. Capacitor 23 is an AGC capacitor, and its relation to the circuitry of the receiver will be described hereinafter. The load inductance 21 is utilized as a collector load for the transistor 20, because thereby DC voltage supplied to the collector 20 is not materially reduced by load drop, yet at the frequencies involved adequate impedance is provided. Tuning of the input stage 11 is accomplished by coupling to the ferrite rod 10 a tuned series circuit 25, having an inductance 26 wound on the ferrite coil and a tuning capacitor 27 connected across the coil 26. Across the capacitor 27 is provided an additional capacitor 28, which may be connected in circuit or removed from circuit by means of a switch 29. In one position of the switch 29, i.e., the closed circuit position, the tuning circuit 25 is tuned to 100 kc. When the switch is removed to the alternative terminal and the capacitor 28 thereby removed, the tuning circuit 25 is thereby tuned to the frequency 179.5 kc. Since the tuned circuit 25, the ferrite core 10 and the input winding 19 are closely inter-coupled; because the windings 19 and 26 are both wound on the same core 10, the tuning of the circuit 25 is essentially communicated to the input circuit of the amplifier, i.e., a greater signal appears across the winding 19 for signals to which the tuning circuit 25 is resonant than for other frequencies. For frequencies to which the tuning circuit 25 is tuned, relatively heavy currents flow in the circuit, inducing relatively heavy flux variations in the ferrite rod 10, which in turn are communicated as voltages to the windings 19.

The second stage 12 of the receiver utilizes a PNP transistor 30. The base of transistor 30 is coupled to the collector of transistor 20 via coupling capacitor 31, and that base is connected via a relatively high resistance 32 (10. kc.) to the high voltage terminal of the capacitor 23. The latter in turn is connected to the junction of resistances 33 and 34, that end of the resistance 34 which is remote from the junction 35 being connected to a B+ terminal 36. The latter is bypassed to ground for stray signals by a filter capacitor 37.

The emitter of the transistor 30 is grounded and the collector is connected to the midpoint 38, or approximately to the midpoint, of a primary winding 39 of a transformer 40 having an adjustable core 41, and which is capable of operating at frequencies 100 kc. or frequency 179.5 kc., after the manner of *if.* transformers in broadcast receivers. Connected across the primary winding 39 is a tuning capacitor 41, to form a tank, and connected across the tuning capacitor 41 is an ancillary tuning capacitor 42, which can be placed in circuit by manipulation of the switch 43. The switch 43 is ganged to the switch 29, by means of link 44, so that the circuits 20 and 25 are always tuned to the same frequency. The lower end of primary winding 39 is connected to a B+ terminal 45, which thereby supplies operating voltage to the collector of transistor 30. On the other hand, bias for the base of the transistor 30 as well as the base of the transistor 20 is derived from the point 35. In this respect, the capacitor 23 acts as a long time constant storage capacitor to provide A&C signal to the base of the transistors 20 and 30 simultaneously, but to the base of transistor 30 only via a resistance 32.

The secondary winding 50 of transformer 40 has one end grounded and the remaining end connected to the cathode of a silicon diode rectifier 51. The anode of the silicon diode receifier 51 is connected through resistance 33 to the point 35. Voltage supplied from the terminal 36 now proceeds through resistances 34, 33, in series through the rectifier 51 and back to ground through the coil 50. The rectifier 51 is accordingly biased, and its bias is selected so that an efficient operating point is found for the diode 51, which provides reasonably large linear response. Provision of a bias for the silicon diode 51 is desirable because silicon diodes have relatively small slopes at the zero operating points thereof and therefore provide very small audio currents when only low signal level is available. The junction point 35 now has a continuous positive voltage appearing thereon in absence of audio signal, and this small positive voltage then becomes the bias voltage for the bases of the transistors 20 and 30. At the same time resistance 33 becomes a load circuit for the diode 51, across which is developed audio voltage, the peak value of which is a function of the input signal amplitude. Accordingly, as input signal amplitude goes up the potential of the point 35 goes down, the biases of the bases of the transistors 20 and 30 approach nearer to ground, and the gains of these transistors decreases. The biases are normally set to provide adequate signal for the minimum level of signal which is expected, but as the listener moves into an area having available a higher signal level, the gain of the receiver decreases to accommodate itself to the increased signal strength.

A capacitor 60 is provided, connected from the anode of diode 51 to ground and is an audio signal integrating capacitor. In this respect capacitor 23 will normally have a very large capacity in comparison with that available in capacitor 60. The latter has a capacity of 0.02 microfarads, which is selected in relation to other impedances present in the circuit to provide an accurate envelope of the modulated audio signal applied to the secondary winding 50 of the transformer 40.

The output of diode 51, which is integrated by the capacitor 60 to form an audio signal, is applied via a coupling capacitor and DC blacking capacitor 61 to the base of a transistor 62, included in audio amplifier 15. The emitter of transistor 62 is grounded and the collector is connected in series with a loudspeaker coil of loudspeaker 16. Operating voltage is applied to the collector of transistor 62 from a B+ terminal 63 and operating bias is supplied to the base of the transistor 62 by means of a resistance 64 connected from the collector to the base.

The batteries which supply voltage and current to the terminals 36, 63 and 45 and 22 are two nickel-cadmium cells, represented at 65, which are connected through a normally closed jack 66 to the terminals collectively represented as B+. Accordingly, so long as the jack switch 66 is closed voltage from the cells is available at the B+ terminals of the receiver. Upon opening the terminals of the jack 66 current may be supplied to the nickel-cadmium cell 65 to charge the same via the contact 67 having an associated ground terminal 68, following typical jack construction, and at the same time the receiver is disabled.

When a receiver of the present type is worn by a listener, the jack arrangement 66 is set to closed position, and voltage is supplied from the cells to the various transistors of the circuit. However, when the receiver is returned to a central storage or to a custodian thereof, the jack may be plugged into a charging circuit which operates via the terminals 67, 68, so that the cells may be on charge when the receivers are not in use by listeners. The listener has no function to perform other than that of station selection, which can be done by a custodian, and in this respect has a choice of only two stations which are selected by one push-pull switch knob. In most applications the station will be preselected by the custodian so that the listener need only hang the receiver of the present system on his ear, as illustrated in FIG. 6 of the accompanying drawings, and to walk freely about the room enclosed by the loop 9, listening to a transmitted program.

Figure 6:
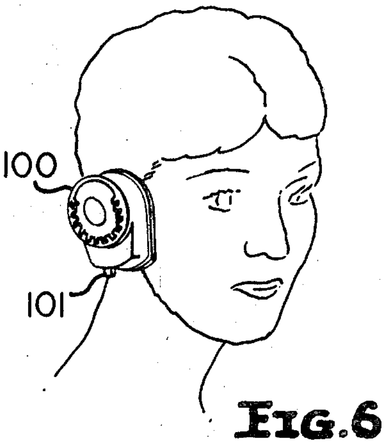
FIG. 6 is a view in perspective of the receiver of FIGS. 2–5 installed in the ear of a listener.

FIG. 6 illustrates how the receiver of the present invention is secured to or maintained on or supported by the listener. It will be noted that externally the receiver presents the appearance of a light plastic shell, from the underside of which projects the small arm 101, which is a tuning knob, i.e., the arm 101 can be pulled out or pressed in, and in the two alternative positions, tunes the receiver to one or the other of its receiving frequencies.

Figure 5:
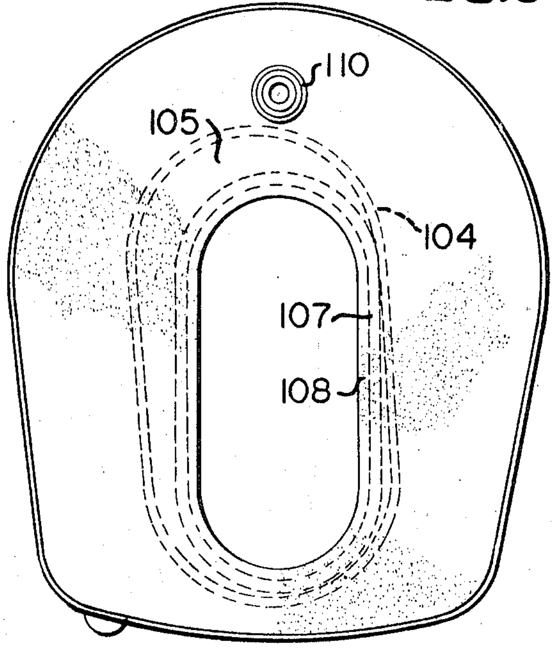
FIG. 5 is a view in plan of the receiver of FIG. 3 but with the cover shown in FIG. 3 removed.

Turning to FIG. 5, there is illustrated the internal structure of the receiver and its shell 100. The shell 100 may be decorated, this being indicated in FIG. 6, but that fact is of no moment relative to the invention itself. It is fabricated of thin wall, light, relatively flexible, plastic material. The shell has a closed side, which is the side observed by the public, and has an open side which is the side lying nearest to the head of the listener. The open side is provided with a flange 102 within which may be frictionally engaged by a circuit board 103. The circuit board 103 has a central bathtub-shaped cutaway 104, to which is secured permanently a listening cup which is longer than it is wide and which is about one-half inch deep. The dimensions of the cup 104 are just about adequate to accept a relatively large ear of a human being. The printed circuit board itself extends beyond the confines of the cup 104, so as to provide an overhang which fits between the head and the upper portion of the ear as at 105. A soft foam rubber covering 106 is provided over the wiring of the circuit board, the wiring lying generally between the circuit board and the felt covering 106, and is indicated rather conventionally at 107, and the soft covering 106 extends over the edges of the flange, as at 107, so that the ear or head of the listener will not come into contact with any hard or sharp surfaces. The flange is illustrated in plan at 107, FIG. 5, and the cup itself is outlined at 104. Accordingly, the reference numeral 105, FIG. 5, shows the overlay of the printed circuit board over the open end of the cup 104, and the line 108 represents the edge of the soft protective layer of plastic or foam rubber.

Mounted on the circuit board 103 are the various electrical components required for operation of the present system. There are illustrated clearly the switch actuator 44, (knob 104) which effects tuning, a phone 16 which communicates through a small opening into the interior of the cup 104. A very small phone may be utilized, such as is common in hearing aids, since the ear is enclosed within a chamber which enhances the sound provided by the phone 16. Very little of that sound can escape from the cavity formed by the chamber 104 and the head and ear of the listener, and the phone 16 is so positioned as to point almost directly to the ear lobe at about the level of the hearing passage in the ear. At the same time externally originally sounds are excluded. Jack plug 110 is provided on the foam rubber side of the receiver, and is illustrated conventionally at FIG. 5. Upon plugging a male charging plug into the jack 110, the switch element 67 is raised, and charging current is supplied to the batteries 65. Upon removing the male plug, the contacts 67, 66 close and power is then supplied from the batteries to the various operating transistors of the receiver. Accordingly, the receivers operate only from the batteries, and when the batteries are being charged the transistors of the receiver are disconnected from the power source. This assures that all the current available from the charging source is supplied to the batteries, but in addition assures that the transistors will not be subjected to overvoltage during the charging process. Were the transistors connected at this time and an over-voltage supplied, the biases might be such that the phone 16 would be overdriven or one or more stages of the transistor be overdriven, resulting in damage.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A signal receiver for support by the external parts of the human ear adjacent the head, comprising,
   a printed circuit board having an opening therein of a size and shape suitable to pass the external parts of the human ear through said opening and thereafter to depend at an edge of said opening from said ear at the junction between the upper ear and the head, and components forming a signal receiver mounted on one side of the printed circuit board and distributed about said opening, wherein the receiver components are mounted on a first side of the printed circuit board, an ear cover arranged to receive and conserve sound for transfer from the receiver to said ear, said ear cover being secured on said first side of the printed circuit board, said ear cover being arranged and adapted to cover the opening at a distance from the edge of the opening sufficiently great to enable said circuit board to depend from said ear at said junction without appreciable distortion of said ear, wherein said signal receiver includes all the components of a complete radio receiver interconnected as an operative radio receiver, including a ferrite rod antenna, power supply, tuner detector, amplifier and headphones.

* * * * *